US011462234B2

(12) United States Patent
Sugihara

(10) Patent No.: US 11,462,234 B2
(45) Date of Patent: Oct. 4, 2022

(54) CONVERSATION ANALYZING DEVICE AND CONVERSATION ANALYZING SYSTEM

(71) Applicant: KYOCERA Document Solutions Inc., Osaka (JP)

(72) Inventor: Hiroshi Sugihara, Osaka (JP)

(73) Assignee: Kyocera Document Solutions, Inc.

(*) Notice: Subject to any disclaimer, the term of this patent is extended or adjusted under 35 U.S.C. 154(b) by 277 days.

(21) Appl. No.: 16/794,624

(22) Filed: Feb. 19, 2020

(65) Prior Publication Data

US 2020/0273482 A1 Aug. 27, 2020

(30) Foreign Application Priority Data

Feb. 26, 2019 (JP) .............................. JP2019-032833

(51) Int. Cl.
*G10L 25/48* (2013.01)
*G10L 25/78* (2013.01)
*G10L 15/32* (2013.01)
*H04R 1/08* (2006.01)

(52) U.S. Cl.
CPC .............. *G10L 25/48* (2013.01); *G10L 15/32* (2013.01); *G10L 25/78* (2013.01); *H04R 1/08* (2013.01)

(58) Field of Classification Search
CPC ......... G10L 15/22; G10L 17/00; G10L 17/06; H04W 4/029; H04W 4/02; H04W 4/80
See application file for complete search history.

(56) References Cited

U.S. PATENT DOCUMENTS

| 10,338,939 | B2* | 7/2019 | Franck | G06Q 50/01 |
| 10,855,952 | B1* | 12/2020 | Rocklin | G06F 3/017 |
| 10,916,251 | B1* | 2/2021 | Brandt | G06Q 30/016 |
| 10,958,599 | B1* | 3/2021 | Penov | G06F 16/285 |
| 2006/0109811 | A1* | 5/2006 | Schotten | G01S 1/68 |
| | | | | 370/328 |
| 2007/0260684 | A1* | 11/2007 | Sharma | G06Q 10/109 |
| | | | | 709/204 |

(Continued)

FOREIGN PATENT DOCUMENTS

| JP | 2006-260102 | 9/2006 |
| JP | 2008-301290 | 12/2008 |

*Primary Examiner* — Mark Villena

(57) ABSTRACT

In a conversation analyzing device, a microphone detects conversation voice of a first analysis subject person who possesses the conversation analyzing device. An acceleration sensor detects movement of the conversation analyzing device. A wireless communication unit (a) detects another conversation analyzing device possessed by another second analysis subject person, and (b) transmits as movement history information a history of movement of the conversation analyzing device to the other conversation analyzing device, and receives movement history information from the other conversation analyzing device. A conversation analyzing unit classifies the conversation voice of the first analysis subject person into any of predetermined plural conversation cases on the basis of (a) the history of movement of this conversation analyzing device, (b) whether the other conversation analyzing device is detected or not, and (c) the received movement history information of the other conversation analyzing device, when detecting the conversation voice of the first analysis subject person.

9 Claims, 4 Drawing Sheets

(56) References Cited

U.S. PATENT DOCUMENTS

| | | | |
|---|---|---|---|
| 2011/0164742 A1* | 7/2011 | Harma | H04M 3/56 379/219 |
| 2012/0135751 A1* | 5/2012 | Mishra | H04W 4/029 455/456.1 |
| 2012/0274445 A1* | 11/2012 | Chin | H04L 67/18 340/8.1 |
| 2013/0210406 A1* | 8/2013 | Vidal | H04W 4/40 455/418 |
| 2013/0297547 A1* | 11/2013 | Ding | G06N 5/02 706/46 |
| 2014/0129560 A1* | 5/2014 | Grokop | G06N 20/00 707/737 |
| 2015/0100580 A1* | 4/2015 | Mathur | G06Q 10/107 707/737 |
| 2015/0149182 A1* | 5/2015 | Kains | G10L 15/18 704/275 |
| 2016/0267422 A1* | 9/2016 | Kothadiya | G06Q 50/01 |
| 2017/0076749 A1* | 3/2017 | Kanevsky | G10L 25/51 |
| 2017/0099556 A1* | 4/2017 | Cierna | H04M 1/725 |
| 2017/0123824 A1* | 5/2017 | Franck | G06F 3/0481 |
| 2018/0165589 A1* | 6/2018 | Weinberg | G06F 1/163 |
| 2018/0349857 A1* | 12/2018 | Dahir | G06Q 10/1095 |
| 2019/0042086 A1* | 2/2019 | White | G06Q 50/01 |
| 2019/0251350 A1* | 8/2019 | Shukla | G06K 9/6256 |
| 2019/0279619 A1* | 9/2019 | Krasadakis | G06F 16/683 |
| 2019/0355352 A1* | 11/2019 | Kane | G06K 9/00832 |
| 2020/0159487 A1* | 5/2020 | Dawson | G06F 3/16 |
| 2020/0186605 A1* | 6/2020 | Rakshit | H04L 67/10 |
| 2020/0257788 A1* | 8/2020 | Bhattacharyya | G06F 21/36 |
| 2021/0264376 A1* | 8/2021 | Kilicoglu | G06Q 10/1095 |

* cited by examiner

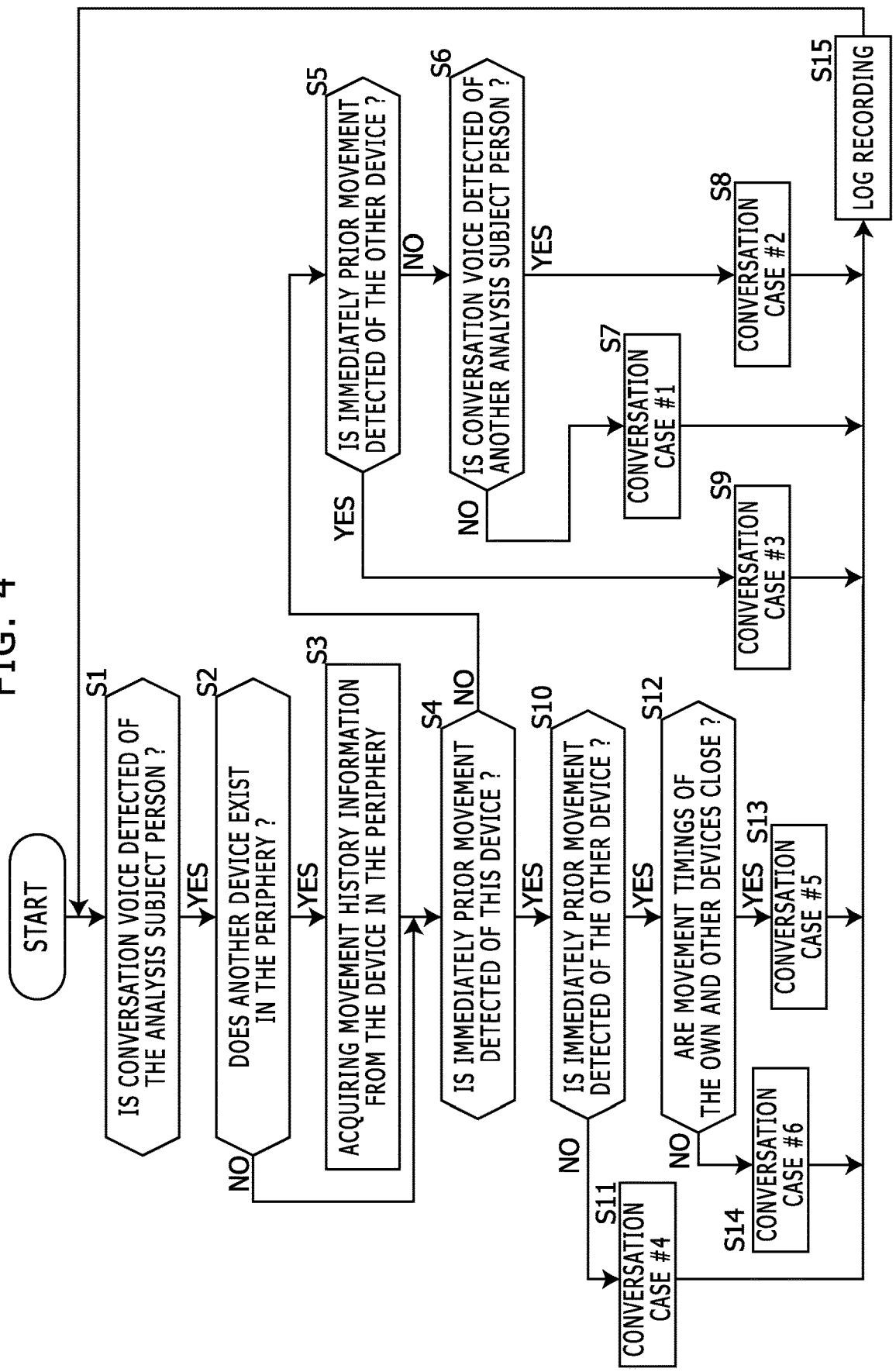

CONVERSATION ANALYZING DEVICE AND CONVERSATION ANALYZING SYSTEM

CROSS-REFERENCE TO RELATED APPLICATIONS

This application relates to and claims priority rights from Japanese Patent Application No. 2019-032833, filed on Feb. 26, 2019, the entire disclosures of which are hereby incorporated by reference herein.

BACKGROUND

1. Field of the Present Disclosure

The present disclosure relates to a conversation analyzing device and a conversation analyzing system.

2. Description of the Related Art

Some systems are proposed to measure communication between members in a group, for some purposes.

In a system, a situation information acquisition server detects a wireless tag of an analysis subject person using a sensor arranged on each specific location and determines a current position of the analysis subject person, and a conversation behavior evaluation device detects a conversation event of this analysis subject person on the basis of the current position of the analysis subject person, and renews a conversation frequency table.

Another system determines a current position of an analysis subject person using an RFID (Radio Frequency IDentifier) assigned to the analysis subject person and thereby detects movement of the analysis subject person on the basis of a history of the current position, detects a gesture of the analysis subject person using an acceleration sensor assigned to the analysis subject person, and determines whether a communication action between analysis subject persons occurs or not on the basis of the movement and the gesture.

However, in the aforementioned systems a current position of an analysis subject person is determined, and therefore, the analysis subject person feels that the analysis subject person is always watched, and consequently, feels large psychological resistance and such systems are hardly introduced in a practical situation.

SUMMARY

A conversation analyzing device according to an aspect of the present disclosure includes a microphone, an acceleration sensor, a wireless communication unit, and a conversation analyzing unit. The microphone is configured to detect conversation voice of a first analysis subject person who possesses the conversation analyzing device. The acceleration sensor is configured to detect movement of the conversation analyzing device. The wireless communication unit is configured to (a) detect another conversation analyzing device possessed by another second analysis subject person, and (b) transmit as movement history information a history of movement of the conversation analyzing device to the another conversation analyzing device, and receive movement history information from the another conversation analyzing device. The conversation analyzing unit is configured to classify the conversation voice of the first analysis subject person into any of predetermined plural conversation cases on the basis of (a) the history of movement of this conversation analyzing device, (b) whether the another conversation analyzing device is detected or not, and (c) the movement history information received when the another conversation analyzing device is detected, when detecting the conversation voice of the first analysis subject person.

A conversation analyzing system according to an aspect of the present disclosure includes conversation analyzing devices corresponding to the aforementioned plural analysis subject persons; and a management server. Further, the management server (a) acquires the conversation case corresponding to each conversation voice from the conversation analyzing devices, and (b) determines a relationship between the plural analysis subject persons on the basis of the acquired conversation case with regard to the plural analysis subject persons.

These and other objects, features and advantages of the present disclosure will become more apparent upon reading of the following detailed description along with the accompanied drawings.

BRIEF DESCRIPTION OF THE DRAWINGS

FIG. 4 shows a flowchart that explains a behavior of each conversation analyzing device 1-$i$ shown in FIGS. 1 and 2.

DETAILED DESCRIPTION

Hereinafter, an embodiment according to an aspect of the present disclosure will be explained with reference to drawings.

Figure 1:
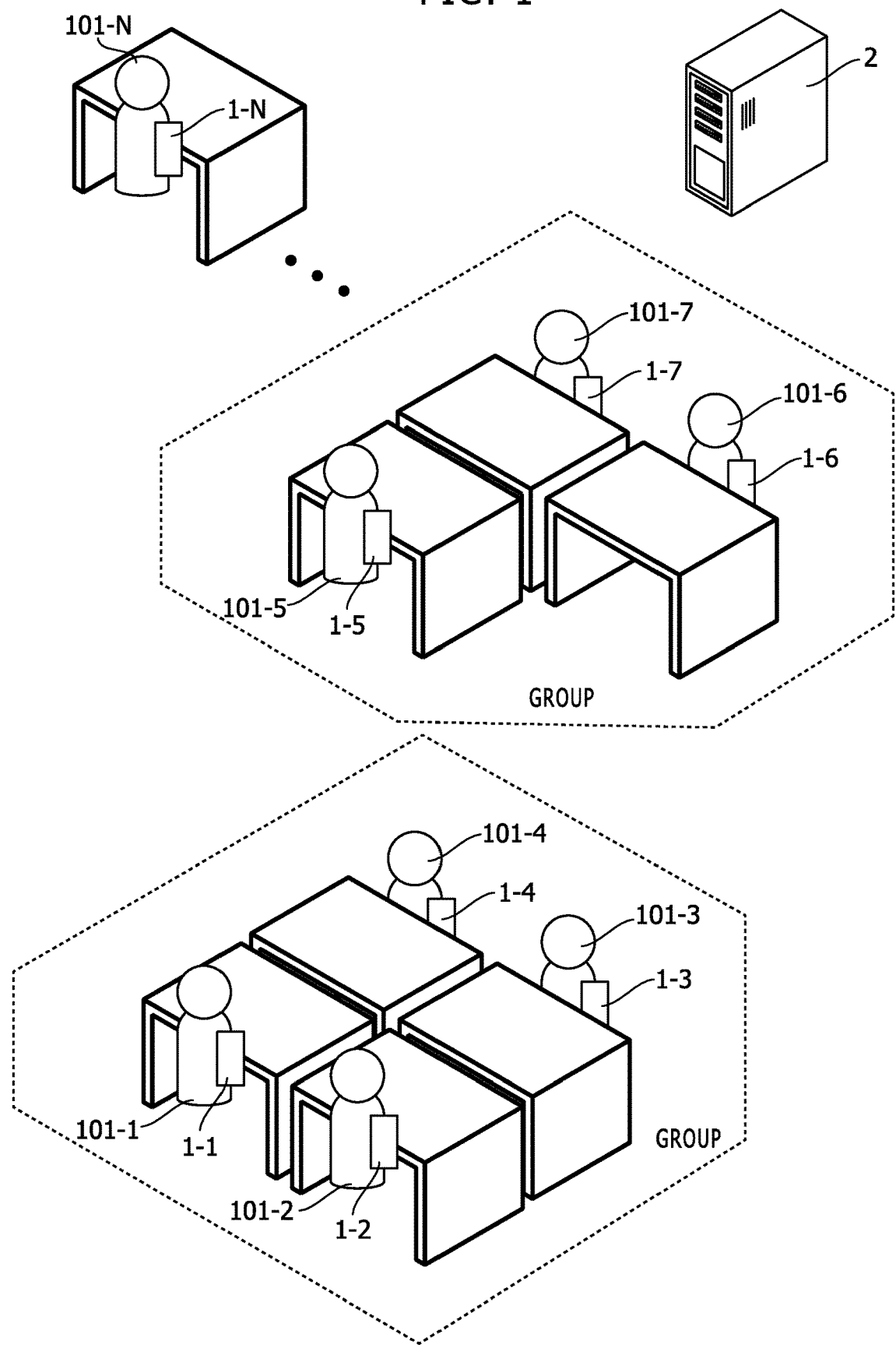
FIG. 1 shows a block diagram that indicates a configuration of a conversation analyzing system according to an embodiment of the present disclosure.

FIG. 1 shows a block diagram that indicates a configuration of a conversation analyzing system according to an embodiment of the present disclosure. The conversation analyzing system shown in FIG. 1 includes plural conversation analyzing devices 1-1 to 1-N (N>1) possessed by plural analysis subject persons 101-1 to 101-N respectively, and a management server 2.

As shown in FIG. 1, in an office or the like, for example, each analysis subject person 101-$i$ (i=1, . . . , N) has his/her own desk, and when the analysis subject persons 101-$i$ belong to a specific group, their own desks are adjacently arranged. For example, in FIG. 1, their own desks of the analysis subject persons 101-1 to 101-4 who belong to a group are arranged adjacently to each other, and their own desks of the analysis subject persons 105-1 to 101-7 who belong to another group are arranged adjacently to each other. It should be noted that the number of analysis subject persons 101-$i$ who belong to a group is not limited.

Each analysis subject person 101-$i$ usually works at his/her own desk, and if needed, (a) has a conversation on telephone at his/her own desk (Conversation case #1), (b) has a conversation with another analysis subject person 101-$j$ in a group at his/her own desk (Conversation case #2), (c) has a conversation with another analysis subject person 101-$j$ when this analysis subject person 101-$j$ moves to the analysis subject person 101-$i$ (Conversation case #3), (d) has a conversation with another analysis subject person 101-$j$ when the analysis subject person 101-$i$ moves to this analysis subject person 101-$j$ (Conversation case #4), (e) has a conversation in a meeting in a meeting room or the like (Conversation case #5), and (f) has a conversation in break time in a freely-usable space, a break room or the like (Conversation case #6). It should be noted that each analysis subject person 101-$i$ carries his/her conversation analyzing device 1-$i$ when he/she moves.

Each conversation analyzing device 1-$i$ detects conversation voice of the analysis subject person 101-$i$, and upon detecting the conversation voice, classifies the conversation voice into any of the aforementioned conversation cases #1 to #6, and counts the number of detection times of each conversation cases #i.

Figure 2:
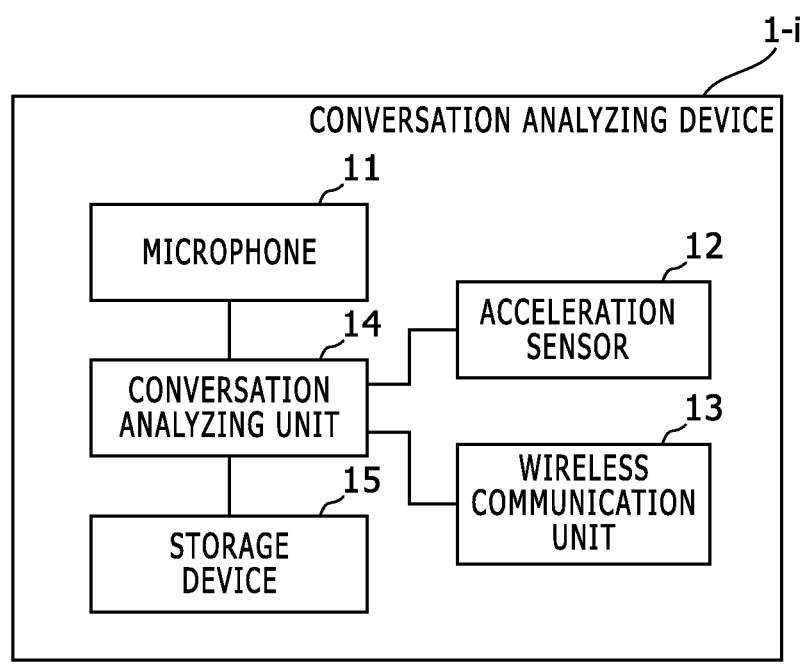
FIG. 2 shows a block diagram that indicates a configuration of each conversation analyzing device 1-$i$ shown in FIG. 1.

FIG. 2 shows a block diagram that indicates a configuration of each conversation analyzing device 1-$i$ shown in FIG. 1.

Specifically, each conversation analyzing device 1-$i$ is a portable device that includes a microphone 11, an acceleration sensor 12, a wireless communication unit 13, a conversation analyzing unit 14, a non-volatile storage device 15 such as flash memory, and the like. For example, the conversation analyzing device 1-$i$ is arranged on the analysis subject person's chest to easily detect his/her conversation voice.

The microphone 11 detects conversation voice of the analysis subject person 101-$i$ who possesses this conversation analyzing device 1-$i$.

The acceleration sensor 12 detects movement of this conversation analyzing device 1-$i$ (i.e. the analysis subject person 101-$i$).

The wireless communication unit 13 (a) detects another conversation analyzing device 1-$j$ of another analysis subject person 101-$j$, and (b) transmits to the other conversation analyzing device 1-$j$ as movement history information a history of movement based on the acceleration sensor 12 of the conversation analyzing device 1-$i$ and receives movement history information of the other conversation analyzing device 1-$j$ from the other conversation analyzing device 1-$j$. Therefore, when the conversation analyzing devices 1-$i$ and 1-$j$ approach each other, the movement history information is exchanged.

For example, the wireless communication unit 13 is a near field wireless communication interface (e.g. Bluetooth (registered trademark)) that has a communicable area of a few meters, and detects another conversation analyzing device 1-$j$ (specifically, the wireless communication unit 13 of the conversation analyzing device 1-$j$) located in the communicable area, and does not detect a conversation analyzing device 1-$j$ in an outside of the communicable area.

The conversation analyzing unit 14 is embodied with a microcomputer or the like, for example, and performs (a) record of the movement history and (b) the classification of the conversation voice.

Specifically, upon detecting the movement using the acceleration sensor 21, the conversation analyzing unit 14 stores a timing (date and time, or the like) of the movement as movement history information in the storage device 15. As the movement history information, one or more movement timings is stored for the movement of a predetermined number of detection times or for the movement detected within a predetermined time. In this process, a current position of the analysis subject person 101-$i$ (i.e. the conversation analyzing device 1-$i$) is not recorded. Further, when detecting conversation voice of this analysis subject person 101-$i$, the conversation analyzing unit 14 classifies this conversation voice into any of predetermined plural conversation cases on the basis of (a) the history of movement of this conversation analyzing device 1-$i$, (b) whether another conversation analyzing device 1-$j$ is detected or not, (c) the movement history information received when the conversation analyzing device 1-$j$ is detected.

Figure 3:
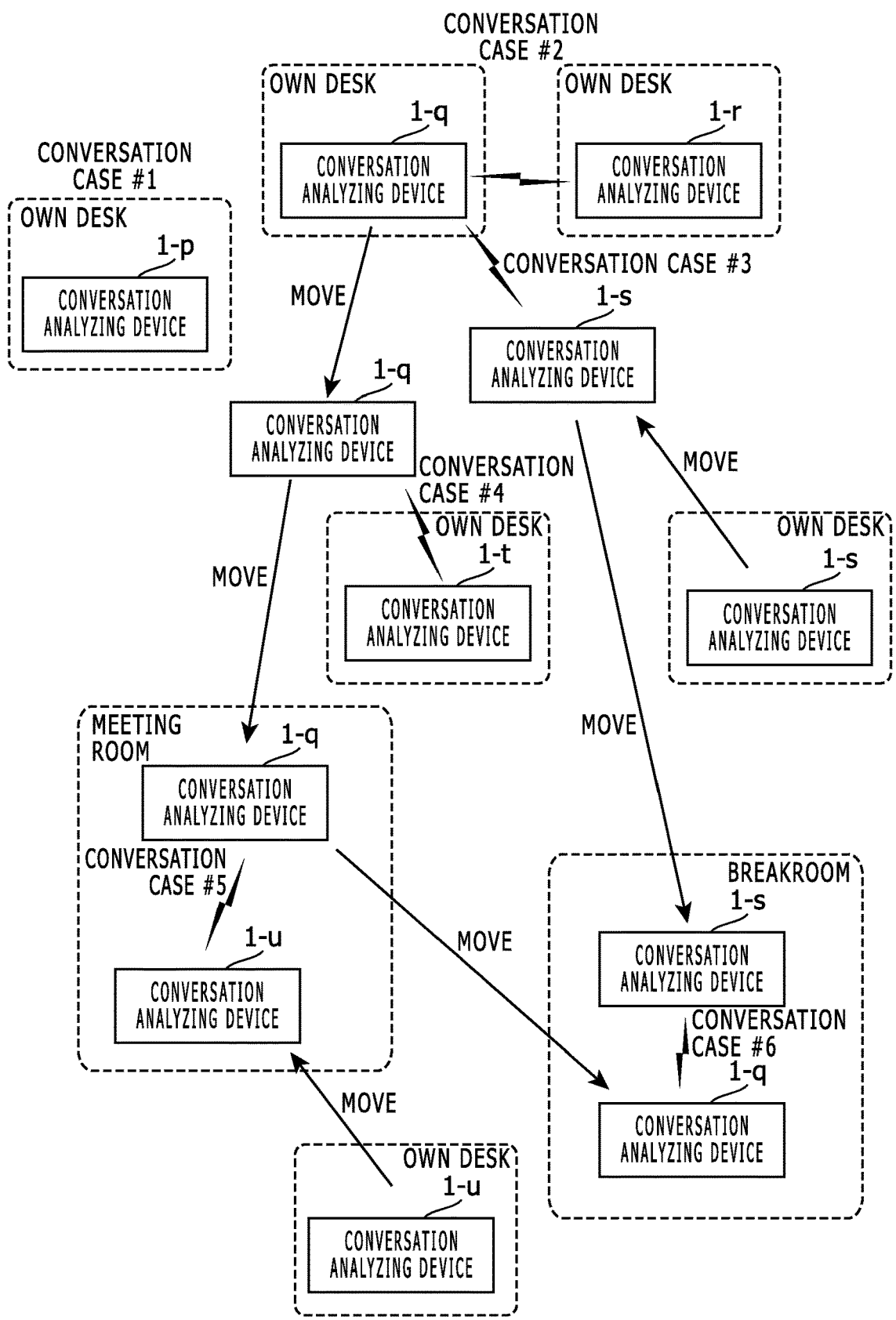
FIG. 3 shows a diagram that explains a relationship between movement of the conversation analyzing devices 1-$p$, 1-$q$, 1-$r$, 1-$s$, 1-$t$, and 1-$u$ and conversation cases.

FIG. 3 shows a diagram that explains a relationship between movement of the conversation analyzing devices 1-$p$, 1-$q$, 1-$r$, 1-$s$, 1-$t$, and 1-$u$ and conversation cases.

For example, as show in FIG. 3, in Conversation case #1 (i.e. conversation on telephone), movement of the conversation analyzing device 1-$p$ of the analysis subject person 101-$p$ does not occur, and conversation voice of another analysis subject person is not detected.

For example, as show in FIG. 3, in Conversation case #2 (i.e. group conversation at his/her own desk), movement of the conversation analyzing device 1-$q$ of the analysis subject person 101-$q$ and another conversation analyzing device 1-$r$ does not occur, and conversation voice of another analysis subject person 101-$r$ is detected.

For example, as show in FIG. 3, in Conversation case #3 (i.e. conversation with another analysis subject person who another analysis subject person moves), movement of the conversation analyzing device 1-$q$ of the analysis subject person 101-$q$ does not occur, but movement of another conversation analyzing device 1-$s$ of an analysis subject person 101-$s$ occurs.

For example, as show in FIG. 3, in Conversation case #4 (i.e. conversation with another analysis subject person when moving to this analysis subject person), movement of the conversation analyzing device 1-$q$ of the analysis subject person 101-$q$ occurs, but movement of another conversation analyzing device 1-$t$ of an analysis subject person 101-$t$ does not occur.

For example, as show in FIG. 3, in Conversation case #5 (i.e. a conversation in a meeting), movement of the conversation analyzing device 1-$q$ and another conversation analyzing device 1-$u$ occurs, and movement timings of the devices 1-$q$ and 1-$u$ are close to each other (because a meeting time is specified in advance).

For example, as show in FIG. 3, in Conversation case #6 (i.e. conversation in break time), movement of the conversation analyzing device 1-$q$ and another conversation analyzing device 1-$u$ occurs, but movement timings of the devices 1-$q$ and 1-$u$ are not close to each other (because a meeting time is not specified in advance).

Therefore, specifically, the conversation analyzing unit 14 classifies conversation voice of the analysis subject person 1-$i$ into any of Conversation cases #1 to #6 in the following manner, on the basis of (a) the history of movement of this conversation analyzing device 1-$i$, (b) whether another conversation analyzing device 1-$j$ is detected or not, (c) movement history information of the other conversation analyzing device 1-$j$.

When detecting conversation voice of the analysis subject person 101-$i$, if (a) there is no movement of this conversation analyzing device 1-$i$, (b) there is no movement of another conversation analyzing device 1-$j$, and (c) conversation voice of another analysis subject person 101-$j$ is not detected with the conversation voice of the analysis subject person 101-$i$ by the microphone 11, then the conversation analyzing unit 14 classifies the conversation voice of the analysis subject person into Conversation case #1 ("conversation on telephone").

Further, when detecting conversation voice of the analysis subject person 101-$i$, if (a) there is no movement of this conversation analyzing device 1-$i$, (b) there is no movement of another conversation analyzing device 1-$j$, and (c) conversation voice of another analysis subject person 101-*j* is detected with the conversation voice of the analysis subject person 101-*i* by the microphone 11, then the conversation analyzing unit 14 classifies the conversation voice of the analysis subject person 101-*i* into Conversation case #2 ("group conversation at his/her own desk").

It should be noted that the conversation analyzing unit 14 distinguishes conversation voice of this analysis subject person 101-*i* and conversation voice of another analysis subject person 101-*j*, for example, on the basis of sound source directions, sound pressure levels, and/or the like. Further, it is determined whether the movement of the analysis subject person 101-*i* or 101-*j* is detected or not by determining whether immediately prior movement (movement that occurred within a predetermined length of prior time) is recorded in the movement history information or not.

Furthermore, when detecting conversation voice of the analysis subject person 101-*i*, if (a) there is no movement of this conversation analyzing device 1-*i*, and (b) there is movement of another conversation analyzing device 1-*j*, then the conversation analyzing unit 14 classifies the conversation voice of the analysis subject person 101-*i* into Conversation case #3 ("conversation when another person comes").

Furthermore, when detecting conversation voice of the analysis subject person 101-*i*, if (a) there is movement of this conversation analyzing device 1-*i*, and (b) there is no movement of another conversation analyzing device 1-*j*, then the conversation analyzing unit 14 classifies the conversation voice of the analysis subject person 101-*i* into Conversation case #4 ("conversation when moving to another person").

Furthermore, when detecting conversation voice of the analysis subject person 101-*i*, if (a) there is movement of this conversation analyzing device 1-*i*, (b) there is movement of another conversation analyzing device 1-*j*, and (c) a difference between a movement timing based on a history of movement of this conversation analyzing device 1-*i* and a movement timing based on the movement history information of the conversation analyzing device 1-*j* is less than a predetermined value, then the conversation analyzing unit 14 classifies the conversation voice of the analysis subject person 101-*i* into Conversation case #5 ("conversation in a meeting").

Furthermore, when detecting conversation voice of the analysis subject person 101-*i*, if (a) there is movement of this conversation analyzing device 1-*i*, (b) there is movement of another conversation analyzing device 1-*j*, and (c) a difference between a movement timing based on a history of movement of this conversation analyzing device 1-*i* and a movement timing based on the movement history information of the conversation analyzing device 1-*j* is not less than a predetermined value, then the conversation analyzing unit 14 classifies the conversation voice of the analysis subject person 101-*i* into Conversation case #6 ("conversation in break time").

As mentioned, the conversation analyzing unit 14 classifies the conversation voice without watching a current position of the analysis subject person 101-*i* with a position detecting device such as GPS (Global Positioning System), an RFID, or the like.

Further, the management server 2 (*a*) acquires the conversation case (i.e. the conversation classification result) corresponding to each detected conversation voice, from the conversation analyzing devices 1-1 to 1-N of plural analysis subject persons 101-1 to 101-N, and (b) determines a relationship between the plural analysis subject persons 101-1 to 101-N on the basis of the acquired conversation case with regard to the plural analysis subject persons 101-1 to 101-N. For example, the wireless communication unit 13 of each conversation analyzing device 1-*i* includes a wireless LAN (Local Area Network) interface, and transmits the conversation classification result through a wireless LAN to the management server 2.

Further, each conversation analyzing device 1-*i* or the management server 2 may determine an amount (i.e. whether the amount is proper or not) and a tendency (an amount of job-related conversations, an amount of job-unrelated conversations, and/or the like) of conversations (i.e. communication) of each analysis subject person 101-*i* in accordance with a predetermined rule (e.g. a criterion formula or the like) on the basis of the conversation classification result. Further, each conversation analyzing device 1-*i* or the management server 2 may present this determination result to each analysis subject person 101-*i*. For example, this determination result may be displayed on a display device (not shown) of the conversation analyzing device 1-*i*, or the analysis subject person 101-*i* may be notified of this determination result with an email addressed to the analysis subject person 101-*i*.

The following part explains a behavior of each conversation analyzing device 1-*i* in the aforementioned system. FIG. 4 shows a flowchart that explains a behavior of each conversation analyzing device 1-*i* shown in FIGS. 1 and 2.

In the conversation analyzing device 1-*i*, the conversation analyzing unit 14 watches whether conversation voice of this analysis subject person 101-*i* is detected with the microphone 11 (in Step S1), and upon detecting conversation voice of the analysis subject person 101-*i*, performs the following process.

Firstly, the conversation analyzing unit 14 determines, using the wireless communication unit 13, whether another conversation analyzing device 1-*j* exists in a communicable range of the wireless communication unit 13 or not (in Step S2).

If another conversation analyzing device 1-*j* exists, then the conversation analyzing unit 14 acquires movement history information of the other conversation analyzing device 1-*j* from the device 1-*j*, using the wireless communication unit 13 (in Step S3).

Subsequently, the conversation analyzing unit 14 determines whether this conversation analyzing device 1-*i* was moved within immediately prior time (i.e. within a predetermined length of prior time until the detection of the conversation voice) or not on the basis of conversation history information of this conversation analyzing device 1-*i* stored in the storage device 15 (in Step S4).

If this conversation analyzing device 1-*i* was not moved within the immediately prior time, then the conversation analyzing unit 14 determines whether the other conversation analyzing device 1-*j* was moved within immediately prior time (i.e. within a predetermined length of prior time until the detection of the conversation voice) or not on the basis of the conversation history information of the other conversation analyzing device 1-*j* acquired from the device 1-*j* (in Step S5).

If the other conversation analyzing device 1-*j* was not moved within the immediately prior time (also if another conversation analyzing device 1-*j* is not detected), the conversation analyzing unit 14 determines whether conversation voice of another analysis subject person 101-*j* is detected or not (in Step S6).

If conversation voice of another analysis subject person 101-*j* is not detected, then the conversation analyzing unit 14 classifies this conversation voice of the analysis subject person 101-*i* into Conversation case #1 (conversation on telephone) (in Step S7).

Contrarily, if conversation voice of another analysis subject person 101-*j* is detected, then the conversation analyzing unit 14 classifies this conversation voice of the analysis subject person 101-*i* into Conversation case #2 (group conversation at his/her own desk) (in Step S8).

Further, if in Step S5 it is determined that the other conversation analyzing device 1-*j* was moved within the immediately prior time, then the conversation analyzing unit classifies this conversation voice of the analysis subject person 101-*i* into Conversation case #3 (conversation when another person comes) (in Step S9).

Furthermore, if in Step S4 it is determined that the conversation analyzing device 1-*i* was moved within the immediately prior time, then the conversation analyzing unit determines whether the other conversation analyzing device 1-*j* was moved within the immediately prior time or not, as well as in Step S5 (in Step S10).

Furthermore, if the other conversation analyzing device 1-*j* was not moved within the immediately prior time, then the conversation analyzing unit 14 classifies this conversation voice of the analysis subject person 101-*i* into Conversation case #4 (conversation when moving to another person) (in Step S11).

Contrarily, if the other conversation analyzing device 1-*j* was moved within the immediately prior time, then the conversation analyzing unit 14 determines whether a difference between the movement timings within the immediately prior time is less than a predetermined value or not on the basis of the movement history information of the both conversation analyzing devices 1-*i* and 1-*j* (in Step S12).

If the difference of the movement timings is less than the predetermined value, then the conversation analyzing unit 14 classifies this conversation voice of the analysis subject person 101-*i* into Conversation case #5 (conversation in a meeting) (in Step S13).

If the difference of the movement timings is not less than the predetermined value, then the conversation analyzing unit 14 classifies this conversation voice of the analysis subject person 101-*i* into Conversation case #6 (conversation in break time) (in Step S14).

Upon classifying the conversation voice of the analysis subject person 101-*i* detected in Step S1 into any of Conversation cases #1 to #6 in the aforementioned manner, the conversation analyzing unit 14 stores this conversation classification result as a log into the storage device 15 (in Step S15). Subsequently, returning to Step S1, the conversation analyzing unit 14 continues the watching for detecting conversation voice of this analysis subject person 101-*i*.

Afterward, for example, with regular intervals, on the basis of the conversation classification result, the conversation analyzing unit 14 or the conversation server 2 (*a*) counts up the number of conversation times of each conversation case for each analysis subject person 101-*i*, and (b) evaluates a conversation amount, a conversation tendency and/or the like of each analysis subject persons 101-*i* on the basis of the counted-up result of the number of conversation times and presents this evaluation result to the analysis subject person 101-*i* and/or records this evaluation result.

For example, this evaluation result may be used for productivity control or mental care of an employee (i.e. the analysis subject person 101-*i*). For example, if a rate of Conversation case #2 is high, then recommendation can be performed for the employee to have conversations of Conversation case #3 and #4. Further, for example, if a rate of Conversation case #2 is low, then it is presumed that communication in his/her group is not enough and therefore recommendation can be performed for the employee to have more conversations of Conversation case #2. Furthermore, for example, if a rate of Conversation case #6 is within a predetermined range, then it may be presumed that the employee adequately changes a mood; and if a rate of Conversation case #6 is too high, then it may be presumed that the employee does not concentrate on his/her job.

As mentioned, in the aforementioned embodiment, the microphone 11 detects conversation voice of a first analysis subject person 101-*i* who possesses this conversation analyzing device 1-*i*; the acceleration sensor 12 detects movement of this conversation analyzing device 1-*i*; and the wireless communication unit 13 (*a*) detects another conversation analyzing device 1-*j* possessed by another second analysis subject person 101-*j*, and (b) transmits as movement history information to this conversation analyzing device 1-*j* a history of movement based on the acceleration sensor 12 of the conversation analyzing device 1-*i* and receives movement history information of this conversation analyzing device 1-*j* from this conversation analyzing device 1-*j*. Further, when detecting conversation voice of the first analysis subject person 101-*i*, the conversation analyzing unit 14 classifies this conversation voice into any of predetermined plural conversation cases on the basis of (a) the history of movement of this conversation analyzing device 1-*i*, (b) whether another conversation analyzing device 1-*j* is detected or not, (c) the movement history information received when the other conversation analyzing device 1-*j* is detected.

Consequently, while reducing psychological resistance of the analysis subject persons, conversations between the analysis subject persons are analyzed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the conversation analyzing unit 14 in a conversation analyzing device 1-*i* among the conversation analyzing devices may (a) acquire the conversation classification result from another conversation analyzing device 1-*j* using the aforementioned wireless LAN interface, (b) count up the number of conversation times of each conversation case for each of the conversation analyzing devices and evaluate a conversation amount, a conversation tendency and/or the like of each of the plural analysis subject persons 101-*i* on the basis of the counted-up result of the number of conversation times of each conversation case, instead of the management server 2, in the same manner as the aforementioned manner of the management server 2.

What is claimed is:

1. A conversation analyzing device, comprising:
a microphone configured to detect conversation voice of a first analysis subject person who possesses the conversation analyzing device;
an acceleration sensor configured to detect movement of the conversation analyzing device;
a wireless communication unit configured to (a) detect another conversation analyzing device possessed by another second analysis subject person within close proximity to the conversation analyzing device possessed by the first analysis subject person and (b) transmit as movement history information a history of movement of the conversation analyzing device to the another conversation analyzing device, and receive movement history information from the another conversation analyzing device if the conversation analyzing device and the another conversation analyzing device are in close proximity to each other as detected by the wireless communication unit; and a conversation analyzing unit configured to classify the conversation voice of the first analysis subject person into any of predetermined plural conversation cases on the basis of (a) the history of movement of this conversation analyzing device, (b) whether the another conversation analyzing device is detected or not, and (c) the movement history information received when the another conversation analyzing device is detected, when detecting the conversation voice of the first analysis subject person.

2. The conversation analyzing device according to claim 1, wherein when detecting the conversation voice of the first analysis subject person, if (a) there is no movement of this conversation analyzing device, (b) there is no movement of the another conversation analyzing device, and (c) conversation voice of the second analysis subject person is not detected with the conversation voice of the first analysis subject person by the microphone, then the conversation analyzing unit classifies the conversation voice of the first analysis subject person into one of the conversation cases that indicates "conversation on telephone".

3. The conversation analyzing device according to claim 1, wherein when detecting the conversation voice of the first analysis subject person, if (a) there is no movement of this conversation analyzing device, (b) there is no movement of the another conversation analyzing device, and (c) conversation voice of the second analysis subject person is detected with the conversation voice of the first analysis subject person by the microphone, then the conversation analyzing unit classifies the conversation voice of the first analysis subject person into one of the conversation cases that indicates "group conversation at his/her own desk".

4. The conversation analyzing device according to claim 1, wherein when detecting the conversation voice of the first analysis subject person, if (a) there is no movement of this conversation analyzing device, and (b) there is movement of the another conversation analyzing device, then the conversation analyzing unit classifies the conversation voice of the first analysis subject person into one of the conversation cases that indicates "conversation when another person comes".

5. The conversation analyzing device according to claim 1, wherein when detecting the conversation voice of the first analysis subject person, if (a) there is movement of this conversation analyzing device, and (b) there is no movement of the another conversation analyzing device, then the conversation analyzing unit classifies the conversation voice of the first analysis subject person into one of the conversation cases that indicates "conversation when moving to another person".

6. The conversation analyzing device according to claim 1, wherein when detecting the conversation voice of the first analysis subject person, if (a) there is movement of this conversation analyzing device, (b) there is movement of the another conversation analyzing device, and (c) a difference between a movement timing based on a history of movement of this conversation analyzing device and a movement timing based on the movement history information of the another conversation analyzing device is less than a predetermined value, then the conversation analyzing unit classifies the conversation voice of the first analysis subject person into one of the conversation cases that indicates "conversation in a meeting".

7. The conversation analyzing device according to claim 1, wherein when detecting the conversation voice of the first analysis subject person, if (a) there is movement of this conversation analyzing device, (b) there is movement of the another conversation analyzing device, and (c) a difference between a movement timing based on a history of movement of this conversation analyzing device and a movement timing based on the movement history information of the another conversation analyzing device is not less than a predetermined value, then the conversation analyzing unit classifies the conversation voice of the first analysis subject person into one of the conversation cases that indicates "conversation in break time".

8. The conversation analyzing device according to claim 1, wherein the conversation analyzing unit classifies the conversation voice without watching a current position of the analysis subject person.

9. A conversation analyzing system, comprising:
conversation analyzing devices corresponding to plural analysis subject persons; and
a management server;
wherein each of the conversation analyzing devices comprises:
a microphone configured to detect conversation voice of a first analysis subject person who possesses the conversation analyzing device;
an acceleration sensor configured to detect movement of the conversation analyzing device;
a wireless communication unit configured to (a) detect another conversation analyzing device possessed by another second analysis subject person within close proximity to the conversation analyzing device possessed by the first analysis subject person, and (b) transmit as movement history information a history of movement of the conversation analyzing device to the another conversation analyzing device, and receive movement history information from the another conversation analyzing device if the conversation analyzing device and the another conversation analyzing device are in close proximity to each other as detected by the wireless communication unit; and
a conversation analyzing unit configured to classify the conversation voice of the first analysis subject person into any of predetermined plural conversation cases on the basis of (a) the history of movement of this conversation analyzing device, (b) whether the another conversation analyzing device is detected or not, and (c) the movement history information received when the another conversation analyzing device is detected, when detecting the conversation voice of the first analysis subject person; and
the management server (a) acquires the conversation case corresponding to each conversation voice from the conversation analyzing devices, and (b) determines a relationship between the plural analysis subject persons on the basis of the acquired conversation case with regard to the plural analysis subject persons.

* * * * *